US012105472B2

(12) United States Patent
Takeuchi et al.

(10) Patent No.: US 12,105,472 B2
(45) Date of Patent: Oct. 1, 2024

(54) CARRIER FOR FORMING ELECTROPHOTOGRAPHIC IMAGE, DEVELOPING AGENT FOR FORMING ELECTROPHOTOGRAPHIC IMAGE, METHOD OF FORMING ELECTROPHOTOGRAPHIC IMAGE, ELECTROPHOTOGRAPHIC IMAGE FORMING APPARATUS, AND PROCESS CARTRIDGE

(71) Applicants: Kento Takeuchi, Shizuoka (JP); Masashi Nagayama, Shizuoka (JP); Tohru Suganuma, Shizuoka (JP); Tomomi Suzuki, Shizuoka (JP)

(72) Inventors: Kento Takeuchi, Shizuoka (JP); Masashi Nagayama, Shizuoka (JP); Tohru Suganuma, Shizuoka (JP); Tomomi Suzuki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/326,888

(22) Filed: May 31, 2023

(65) Prior Publication Data

US 2023/0393491 A1 Dec. 7, 2023

(30) Foreign Application Priority Data

Jun. 3, 2022 (JP) ................................ 2022-091090

(51) Int. Cl.

| | |
|---|---|
| ***G03G 15/08*** | (2006.01) |
| ***G03G 9/00*** | (2006.01) |
| ***G03G 9/113*** | (2006.01) |

(52) U.S. Cl.

CPC ............. *G03G 9/113* (2013.01); *G03G 15/08* (2013.01); *G03G 15/0818* (2013.01); *G03G 2215/0607* (2013.01)

(58) Field of Classification Search

CPC ...... G03G 9/113; G03G 9/1131; G03G 15/08; G03G 2215/0607

(Continued)

(56) References Cited

U.S. PATENT DOCUMENTS

| | | | | |
|---|---|---|---|---|
| 2006/0166125 A1* | 7/2006 | Skorokhod | .......... | G03G 9/1134 430/111.1 |
| 2008/0299471 A1* | 12/2008 | Kamoto | ............... | G03G 9/1075 430/48 |

(Continued)

FOREIGN PATENT DOCUMENTS

| | | |
|---|---|---|
| CN | 105652616 A * | 6/2016 |
| JP | 6-202381 | 7/1994 |

(Continued)

OTHER PUBLICATIONS

U.S. Appl. No. 18/065,904, filed Dec. 14, 2022, Kaede Masuko, et al.

(Continued)

*Primary Examiner* — Robert B Beatty
(74) *Attorney, Agent, or Firm* — Grüneberg and Myers PLLC

(57) ABSTRACT

A carrier for forming an electrophotographic image contains a core particle and a coating layer coating the core particle, wherein the coating layer contains a particle containing antimony and an anionic dispersant and the particle containing antimony includes a substrate particle containing a first inorganic fine particle.

14 Claims, 1 Drawing Sheet

(58) Field of Classification Search
USPC ............................ 399/252; 430/111.1, 122.2
See application file for complete search history.

(56) References Cited

U.S. PATENT DOCUMENTS

| | | | | |
|---|---|---|---|---|
| 2010/0068645 | A1* | 3/2010 | Iwatsuki .............. | G03G 9/1131 430/111.3 |
| 2012/0322004 | A1* | 12/2012 | Shoji .................... | G03G 9/1136 430/137.13 |
| 2013/0209932 | A1* | 8/2013 | Hasegawa ............ | G03G 9/1085 399/262 |
| 2015/0153665 | A1 | 6/2015 | Kishida et al. | |
| 2017/0329248 | A1* | 11/2017 | Nakamura ........... | G03G 9/1133 |
| 2021/0141319 | A1 | 5/2021 | Takabayashi et al. | |
| 2022/0291603 | A1 | 9/2022 | Kishida et al. | |
| 2022/0291604 | A1* | 9/2022 | Suzuki ................. | G03G 9/1131 |

FOREIGN PATENT DOCUMENTS

| | | |
|---|---|---|
| JP | 8-305090 | 11/1996 |
| JP | 2001-117288 | 4/2001 |
| JP | 2012-058448 | 3/2012 |
| JP | 2014-029464 | 2/2014 |
| JP | 2017-167387 | 9/2017 |
| JP | 2018-205408 | 12/2018 |
| JP | 2021-076820 | 5/2021 |

OTHER PUBLICATIONS

U.S. Appl. No. 18/115,771, filed Mar. 1, 2023, Masashi Nagayama, et al.

U.S. Appl. No. 18/052,977, filed Nov. 7, 2022, Minoru Masuda, et al.

* cited by examiner

CARRIER FOR FORMING ELECTROPHOTOGRAPHIC IMAGE, DEVELOPING AGENT FOR FORMING ELECTROPHOTOGRAPHIC IMAGE, METHOD OF FORMING ELECTROPHOTOGRAPHIC IMAGE, ELECTROPHOTOGRAPHIC IMAGE FORMING APPARATUS, AND PROCESS CARTRIDGE

CROSS-REFERENCE TO RELATED APPLICATIONS

This patent application is based on and claims priority pursuant to 35 U.S.C. § 119 to Japanese Patent Application No. 2022-091090, filed on Jun. 3, 2022, in the Japan Patent Office, the entire disclosure of which is hereby incorporated by reference herein.

BACKGROUND

Technical Field

The present disclosure is related to a carrier for forming an electrophotographic image, a developing agent for forming an electrophotographic image, a method of forming an electrophotographic image, an electrophotographic image forming apparatus, and a process cartridge

Description of the Related Art

In electrophotography, images are output by forming a latent electrostatic image with electrostatic charges on a latent electrostatic image bearer made of a substance such as photoconductive materials, attaching charged toner to the latent electrostatic image to obtain a visible toner image, transferring the toner image to a printing medium, typically paper, and fixing the toner image on the printing medium. Currently, quick charging of a carrier to toner is highly demanded as the speed of printing has increased recently.

The charging size of a carrier fluctuates depending on toner spent on the carrier. Toner spent occurs when toner deteriorates in printing over a long period of time and the degraded toner attaches to the carrier's surface. Resultantly, the toner supplied to a developing agent is poorly charged because the toner is not sufficiently triboelectrically charged with the carrier. The toner poorly charged may accumulate outside a developing device, which is called toner scattering. In addition, such toner causes a problem called background fouling, in which the toner is developed on a white portion of a printing medium.

To respond to demand on further enhancing the image quality and achieving high performance, the carrier in a developing device receives strong stress. Under this stress, the resin covering the carrier is scraped or peeled and finally, its core becomes exposed, which destabilizes the carrier's electric resistance. This unstable electric resistance causes a phenomenon called carrier attachment, in which a carrier is transferred and attaches to a latent electrostatic image bearer. This carrier attachment results in dot missing in the end or center of an image and is recognized as a severe problem to be answered.

SUMMARY

According to embodiments of the present disclosure, a carrier for forming an electrophotographic image is provided which contains a core particle and a coating layer coating the core particle, wherein the coating layer contains a particle containing antimony and an anionic dispersant and the particle containing antimony includes a substrate particle containing a first inorganic fine particle.

As another aspect of embodiments of the present disclosure, a developing agent for forming an electrophotographic image is provided which contains the carrier mentioned above.

As another aspect of embodiments of the present disclosure, a method of forming an electrophotographic image is provided which includes forming the electrophotographic image with the developing agent mentioned above.

As another aspect of embodiments of the present disclosure, an electrophotographic image forming apparatus is provided which includes a container containing the developing agent mentioned above.

As another aspect of embodiments of the present disclosure, a process cartridge is provided which includes a container containing the developing agent mentioned above.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
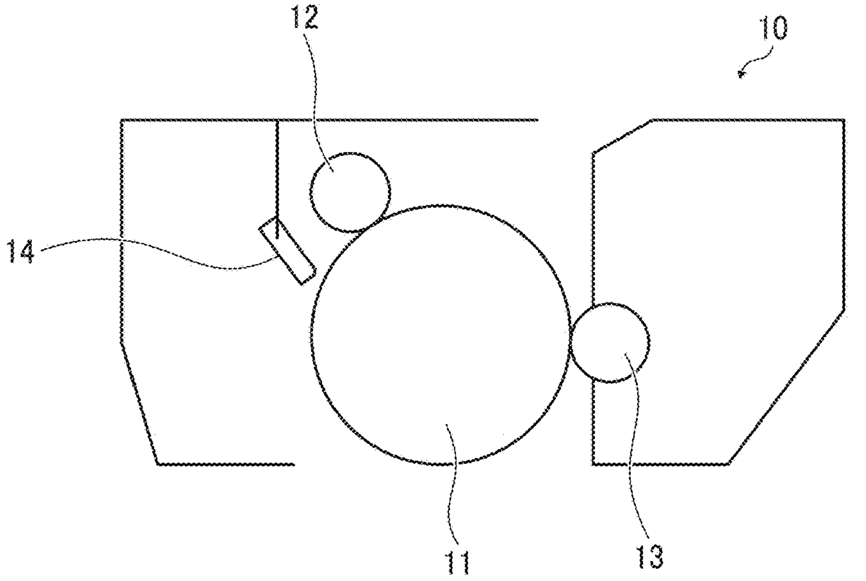
FIG. 1 is a schematic diagram illustrating an example of a process cartridge according to an embodiment of the present invention.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a carrier is provided which demonstrates high durability, controls its electric properties in a low electric resistance range, reduces the fluctuation of the carrier's electric resistance in printing over a long period of time, and reduces carrier attachment to an image bearer.

Embodiments of the present disclosure are described in detail below.

The carrier for forming an electrophotographic image of the present disclosure is as described in 1.

1. The carrier for forming an electrophotographic image contains a core particle and a coating layer coating the core particle, wherein the coating layer contains a particle containing antimony and anionic dispersant and the particle containing antimony including a substrate particle containing a first inorganic fine particle.

The present disclosure also preferably includes the following embodiments of the following 2 to 12.

2. The carrier according to the 1 mentioned above, wherein the particle containing antimony contains tin oxide doped with antimony.

3. The carrier according to the 1 or 2 mentioned above, wherein the particle containing antimony contains diantimony pentoxide.

4. The carrier according to any one of the 1 to 3 mentioned above, wherein the first inorganic fine particle contains aluminum oxide.

5. The carrier according to any one of the 1 to 4 mentioned above, wherein the anionic dispersant contains a phosphoric acid ester surfactant.

6. The carrier according to any one of the 1 to 5 mentioned above, wherein the coating layer contains a defoaming agent.

7. The carrier according to the 6 mentioned above, wherein the defoaming agent contains a silicone-based defoaming agent.

8. The carrier according to any one of the 1 to 7 mentioned above, wherein the coating layer further contains a second inorganic fine particle.

9. The carrier according to the 8 mentioned above, wherein the second inorganic fine particle is white.

10. The carrier according to the 8 or 9 mentioned above, wherein the second inorganic fine particle contains barium sulfate.

11. The carrier according to any one of the 8 to 10 mentioned above, wherein the second inorganic fine particle contains barium sulfate alone.

12. A developing agent for forming an electrophotographic image includes the carrier of any one of the 1 to 8 mentioned above.

13. A method of forming an electrophotographic image includes forming the electrophotographic image with the developing agent of the 12 mentioned above.

14. An electrophotographic image forming apparatus contains the developing agent of the 12 mentioned above.

15. A process cartridge contains the developing agent of the 12 mentioned above.

The typical technology on electrophotography involves the following issues.

Methods of enhancing attachability to the core of a carrier and durability thereof by covering the core with a suitable resin material have been proposed in Japanese Unexamined Patent Application Publication Nos. H8-30502001-117288 and H06-202381. However, due to an increase in the printing speed and toner fixing at low temperatures, carrier spent and abrasion of the resin are likely to occur. Changing the resin material is insufficient to solve these problems.

Methods of enhancing durability of a carrier coating layer by adding inorganic fine particles to a coating resin have been proposed in Japanese Unexamined Patent Application Publication Nos. H8-202381 and 2017-167387.

Simply adding inorganic fine particles to a coating resin enhances durability of a carrier.

However, it triggers carrier attachment when the inorganic fine particle not firmly attached detaches from the carrier, causing a change in the electric properties of the carrier. A method of enhancing durability of a carrier in printing for a long period of time by using a highly durable resin for a coating resin and letting a large amount of inorganic fine particles present around the coating resin's surface has been proposed in Japanese Unexamined Patent Application Publication No. 2012-58448.

As the number of the inorganic fine particles increases, the inorganic fine particles have a higher chance of detaching from sites where the inorganic fine particles are heavily present due to locality. Also, the electric properties of the inorganic fine particles change if the coating resin is scraped so that the inorganic fine particles are exposed.

A method of enhancing durability of a carrier and adjusting the carrier's electric resistance by adding conductive fine particles to coating layer of the carrier has been proposed in Japanese Unexamined Patent Application Publication No. 2014-029464.

The electric resistance value obtained is determined by the conductivity and content of the conductive fine particle. A particle with high conductivity needs increasing its amount added to a carrier coating layer to increase the electric resistance value, due to which durability can be enhanced. However, the electric resistance may significantly decrease if the conductive fine particles detach or the coating resin is scraped, thereby exposing the fine particles. Conversely, adding only a small amount of a particle with low conductivity to the coating layer of a carrier achieves the target value but lowers the layer's durability.

The carrier for forming an electrophotographic image of the present disclosure can control the electric properties in a low resistance range while demonstrating high durability with a small amount of conductive fine particles added to the carrier. Also, the electric resistance of the carrier does not significantly fluctuate in printing over a long period of time. Moreover, the carrier reduces carrier attachment at a non-imaging portion.

As described in the 1 mentioned above, the carrier for forming an electrophotographic image of the present disclosure contains a core particle and a coating layer coating the core particle, wherein the coating layer contains a particle containing antimony and an anionic dispersant and the particle containing antimony includes a substrate particle containing a first inorganic fine particle.

There are following two points for a carrier for forming an electrophotographic image to control the electric properties in a low electric resistance range while demonstrating high durability by adding a small amount of conductive fine particles.

The first point is to contain particles containing antimony each containing a substrate particle containing an inorganic fine particle (first inorganic fine particle) in a coating layer. Since antimony has good conductivity, a carrier with a small amount of antimony has good conductivity. Since the amount of antimony added is small, the fine particle is prevented from detaching from the coating layer or being exposed when the coating layer is scraped. Antimony can be contained in a particle or used as a particle. Particularly, using tin oxide doped with antimony makes an adjusting agent with high resistance. Using the substrate particle of inorganic fine particles can prevent particles with antimony from collapsing in a coating layer into fragments and detaching from the coating layer, keeping the ability of adjusting a resistance.

The substrate inorganic fine particle can be made of classical or new materials. Aluminum oxide is particularly preferable to enhance the ability of adjusting a resistance. Aluminum oxide has good affinity with electroconductive treatment on the surface of a substrate particle, which is considered to efficiently work on the treatment.

The particle containing antimony preferably has an equivalent circle diameter of from 500 to 1,000 nm. A particle diameter of 500 nm or greater, which is not excessively small, efficiently lowers the carrier resistance. A particle diameter of 1,000 nm or less reduces the detachment of the particle containing antimony from the coating layer's surface.

Preferably, the proportion of the particle containing antimony is from 40 to 120 parts by mass to 100 parts by mass of the resin in a coating layer and, more preferably, from 60 to 100 parts by mass.

Preferably, the particle containing antimony preferably contains diantimony pentoxide. Antimony for adjusting conductivity is generally diantimony trioxide, which is not preferable because it is harmful to a human body. Instead, using diantimony pentoxide is suitable because it is less harmful to a human body and contributes to obtaining a carrier with an efficient resistance adjusting ability.

The second point is to contain an anionic dispersant in the coating layer. If an anionic surfactant is prescribed to a coating liquid for forming a coating layer containing substances such as a resin, inorganic fine particles containing particles containing antimony, and a diluted solvent, the anionic surfactant disperses the inorganic fine particles to the degree of a primary particle diameter, thus obtaining a sharp particle size distribution. This dispersant eliminates coarse particles and fine particles that are insufficiently embedded in the resin and weakly attached to the surface of a carrier. While particles containing antimony achieves high conductivity in a small amount, this small amount risks lowering durability of a coating layer. However, the inorganic fine particles are uniformly located in the coating layer by this dispersant, maintaining the film's durability. The dispersant has a group compatible with a resin and a group compatible with the inorganic fine particle. It enhances affinity between the resin and the inorganic fine particle. Resultantly, the resin and the inorganic fine particle in a coating layer firmly attach to each other, forming a tougher film. Thus, the inorganic fine particle is not readily detached from the coating layer under a stress in printing over a long period of time. This dispersant thus reduces the carrier attaching to a solid image portion over time.

As described above, the dispersant needs to be an anionic dispersant. An anionic dispersant is excellent in dispersing. This dispersant sharpens the particle size distribution of the inorganic fine particles and uniformly arranges the inorganic fine particles in a coating liquid. The anionic dispersant is not particularly limited. It includes, but is not limited to, a phosphoric acid ester surfactant, a sulfuric acid ester surfactant, a sulfuric acid ester surfactant, and a carboxylic acid ester surfactant. Of these, a phosphoric acid ester surfactant is preferable. A phosphoric acid ester surfactant is capable of suitably dispersing the inorganic fine particles in a coating layer to the degree of a primary particle diameter, uniforming the inorganic fine particles in the coating layer, and enhancing the affinity between the resin and the inorganic fine particle. In addition, as a result of an investigation made by the inventors of the present invention, adding an anionic dispersant with a phosphoric acid ester backbone is found to further reduce toner scattering. This further reduction is due to the structural portion of a phosphoric acid ester being positively charged against negatively charged toner. If an anionic dispersant containing a phosphoric acid ester surfactant is added, chargeability of this dispersant against toner is enhanced. Particularly, chargeability of a dispersant immediately after the dispersant is mixed and agitated with toner, so-called initial rising of charging, becomes good, which significantly reduces toner scattering at replenishment caused by the toner insufficiently charged during replenishing.

This anionic dispersant preferably contains a phosphoric acid ester surfactant as the main component. The proportion of the main component, a phosphoric acid ester surfactant, in an anionic dispersant in this embodiment is preferably 50 percent by mass or greater. More preferably, the proportion is 90 percent by mass or greater.

The amount of an anionic dispersant added is preferably from 0.5 to 10.0 parts by mass to the entire of 100 percent by mass of particles containing antimony and the inorganic fine particles other than the particles with antimony. An amount of 0.5 parts by mass or greater of the anionic dispersant disperses all of the inorganic fine particles to primary particle diameters, decreasing aggregated inorganic fine particles. If aggregated inorganic fine particles are present, the aggregated particles are not firmly fixed to a coating layer and detaches therefrom under stress over initial printing, which lowers the resistance of a carrier, resulting in carrier attachment. In addition, since the amount of the dispersant present at the uppermost surface of a coating layer is small, the initial rising of charging is not good, which leads to a disadvantage over toner scattering. An amount of 10.0 parts by mass of an anionic dispersant added lessens the amount of the dispersant component failing to attach to the inorganic fine particle in a coating layer, thereby adjusting the amount of the resin in the coating layer to be suitable, which strengthen the coating layer. In addition, this amount inhibits the inorganic fine particles from detaching over long-period printing and prevents carrier attachment and toner scattering over long-period printing. The amount of the anionic dispersant is more preferably from 1.0 to 3.0 parts by mass.

In the present disclosure, adding a defoaming agent to a coating layer is preferable. If an anionic surfactant is prescribed to a coating liquid for forming a coating layer containing substances such as a resin, inorganic fine particles containing particles containing antimony, and a diluted solvent, the anionic surfactant is likely to foam the coating liquid although the anionic surfactant demonstrates good dispersibility. If this foamed coating liquid is used for coating, a coating layer is made with the foams present therein, which may result in voids in the coating layer due to the foams.

These voids in a coating layer lower durability of the film and the film are scraped in printing over time. Prescribing a defoaming agent in addition to a dispersant reduces foaming in the coating liquid and producing voids in the coating layer. A carrier produced with this prescription is strong to film-scraping resulting from voids created in a coating layer in printing over time, achieves high durability, and further reduces carrier attachment.

The defoaming agent is not particularly limited. It includes, but is not limited to, a silicone-based, acrylic-based, and vinyl-based defoaming agent. Of these, silicone-based defoaming agent is preferable. Generally, demonstrating a defoaming effect depends on the balance between the compatibility and incompatibility with a solvent. A defoaming agent good about this balance is a silicone-based defoaming agent, which can achieve a high defoaming agent effect and reduce the occurrence of voids in a coating layer.

Specific examples of the procurable defoaming agents include, but are not limited to, KS-530, KF-96, KS-7708, KS-66, and KS-69 (all manufactured by Shin-Etsu Silicone Co., Ltd.), TSF451, THF450, TSA720, YSA02, TSA750, and TSA750S (all manufactured by Momentive Performance Materials Inc.), BYK-065, BYK-066N, BYK-070, BYK-088, and BYK-141 (all manufactured by BYK Chemie), DISPARLON 1930N, DISPARLON 1933, and DISPARLON 1934 (all manufactured by Kusumoto Chemicals, Ltd.).

The amount of the defoaming agent added to a coating liquid for forming a coating layer is preferably from 1.0 to 10.0 parts by mass to 100 parts by mass of the coating liquid. An amount of 1.0 part by mass or greater of the defoaming agent achieves an efficient defoaming effect and prevents voids from appearing in a coating layer. An amount of 10.0 parts by mass or less of the defoaming agent prevents deficiency on an applied film's surface, which is called cissing, reduces generating a brittle coating layer on the carrier's surface and detaching of inorganic fine particles, and improves carrier attachment on a solid image portion. The amount of the defoaming agent added is more preferably from 2.0 to 7.0 part by mass.

The coating layer preferably contains an inorganic fine particle (second inorganic fine particle) other than the particles containing antimony. This second inorganic fine particle enhances durability of the coating layer to abrasion and reduces deterioration of the coating layer resulting from abrasion and scraping. Durability of the coating layer is enhanced under the presence of the particle containing antimony; however, since the amount of the particle containing antimony in a coating layer affects the resistance value of a carrier, it is not suitable to change the amount in order to enhance durability of the carrier. Therefore, the second inorganic fine particle is preferably added to play a role of ensuring durability.

This second inorganic fine particle is preferably white. If this white inorganic fine particle is detached from a coating layer, the detached inorganic fine particle does not significantly affect the color of toner.

The materials of the second inorganic fine are not particularly limited. If a second inorganic fine particle made of a material with a positive polarity is used in combination with a negatively-charged toner, the charging power of the inorganic fine particle is stable for an extended period of time.

Specific examples of the second inorganic fine particles include, but are not limited to, fine particles of metals such as gold, silver, coper, silica, and aluminum, titanium oxide, tin oxide, zinc oxide, zirconium oxide, indium oxide, antimony oxide, calcium oxide, ITO, silicone oxide, colloidal silica, aluminum oxide, yttrium oxide, cobalt oxide, copper oxide, iron oxide, manganese oxide, niobium oxide, vanadium oxide, selenium oxide, barium sulfate, magnesium oxide, magnesium hydroxide, silicon dioxide, boron nitride, silicon nitride, potassium titanate, hydrotalcite, antimony- or tungsten-doped tin oxide, and tin-doped indium oxide. Of these, preferred are barium sulfate, magnesium oxide, magnesium hydroxide, and hydrotalcite. Of these, barium sulfate is most suitable because it is white and has high chargeability to a negatively charged toner.

If the second inorganic fine particle is barium sulfate, using barium sulfate alone is preferable. Barium sulfate demonstrates a charge-imparting effect when barium sulfate present on the coating layer of a carrier is brought into contact with toner. The contact ratio with toner increases when barium sulfate is used alone, demonstrating the most charge-imparting effect. Barium sulfate alone means that the particles used as the second inorganic fine particles is composed of barium sulfate alone.

The second inorganic fine particle preferably has an equivalent circle diameter of from 400 to 900 nm. Within this range, the second inorganic fine particle can be present in a convex state to the surface of a coating layer, which ensures chargeability with toner. The equivalent circle diameter of the second inorganic fine particle is more preferably 600 nm or greater to achieve stable charging ability and developing power. An equivalent circle diameter of 900 nm or less of the second inorganic fine particle is not excessively large against the thickness of a coating layer. The second inorganic fine particle of this size can be sufficiently held in and not readily detached from the resin of the coating layer, which is preferable.

Preferably, the proportion of the second inorganic fine particle is from 30 to 100 parts by mass to 100 parts by mass of the resin in a coating layer and, more preferably, from 50 to 80 parts by mass.

The equivalent circle diameter in the present disclosure can be confirmed by a classical method, which includes measuring an inorganic fine particle with a device such as Nanotrac UPA series, manufactured by NiKKISO CO., LTD. If a carrier is measured, the coating layer of the carrier is severed with focused ion beam (FIB) followed by confirming with scanning electron microscopy (SEM) or energy dispersive X-ray spectroscopy (EDX). One of the methods is as follows:

A carrier is mixed with an embedding resin (two-liquid mixture, thirty-minute curing epoxy resin, manufactured by Chemical Development Corporation) followed by being left to rest for one night to cure and mechanical polishing to obtain a rough cross section sample; the cross section of the resulting sample is finished with a cross section polisher (SM-09010, manufactured by JEOL at an acceleration voltage of 5.0 kV and a beam current of 120 μA; the sample obtained is imaged with a scanning electron microscope (Merlin, manufactured by Carl Zeiss AG) at an acceleration voltage of 0.8 kV with a magnifying power of 30,000; and the image obtained is taken into a TIFF image followed by measuring the equivalent circle diameter of 100 particles with Image-Pro Plus, manufactured by Media Cybermetics, to obtain the average of the 100 particles.

The method of measuring the equivalent circle diameter of a second inorganic fine particle is not limited to this example. In addition, the thickness of the coating layer can be measured from an image obtained in a similar manner. However, there are individual differences in particles and the thickness of the coating layer of a particle is inconsistent depending on the site in the particle. The measuring is not limited to one site per particle but the number of n measuring is conducted from a statistical point of view.

The coating layer contains a resin and other optional components in the present disclosure. The resin includes, but is not limited to, a silicone resin, acrylic resin, or a combination thereof. Acrylic resins have strong adhesiveness and low brittleness. Therefore, it has excellent abrasion resistance. On the other side of the coin, since the surface energy of an acrylic resin is high, the charging size of the acrylic resin may decrease depending on the combination with a toner that tends to be easily spent and accumulates on the acrylic resin. In such a case, a silicone resin is used in combination to solve this problem. This is because the silicone resin has a low surface energy, which reduces toner spent component's accumulating caused by film scraping. However, a silicone resin has weak adhesiveness and high brittleness. Therefore, it is easily abraded. Accordingly, striking a balance between those properties of both resins is required to obtain a coating layer that does not easily cause spent but has good abrasion resistance. In such a case, due to the low surface energy of a silicone resin, toner component spent does not easily occur or accumulate caused by film scraping.

The silicone resin in the present disclosure represents all of the known silicone resins. Examples include, but are not limited to, straight silicone resins formed of organosiloxane bonding alone and silicone resins modified with bonding such as alkyd, polyester, epoxy, acrylic, and urethane.

Specific examples of the procurable straight silicone resins include, but are not limited to, KR271, KR255, and KR152, manufactured by Shin-Etsu Chemical Co., Ltd. and SR2400, SR2406, and SR2410, manufactured by DOW CORNING TORAY CO., LTD. It is possible to use a simple silicone resin and also possible to use it in combination with a component that conducts cross-linking reaction and a charge-control component simultaneously.

Specific examples of the procurable modified silicone resins include, but are not limited to, KR206 (alkyd-modified), KR5208 (acrylic-modified), ES1001N (epoxy-modified), and KR305 (urethane-modified), all manufactured by Shin-Etsu Chemical Co., Ltd. and SR2115 (epoxy-modified) and SR2110 (alkyd-modified), both manufactured by DOW CORNING TORAY CO., LTD.

The acrylic resin in the present disclosure represents all the resins including acrylic components and has no particular limitation. In addition, it is possible to use only acrylic resins but optional to use one or more other components simultaneously that conduct cross-linking reaction. Examples of the other components for conducting cross-linking reaction are amino resins and acidic catalysts. The other components are not limited thereto. The amino resin represents guanamie resins and melamine resins, for example. However, the amino resins are not limited thereto. In addition, as the acidic catalyst, any substance demonstrating catalystic function can be used. It includes, but is not limited to, a substance having a reaction group such as a complete alkylized type, methylol group type, imino group type, methylol/imino group type.

If the resin is a silicone resin, an acrylic resin, or a combination thereof, cross-linking proceeds by condensing a silanol group under the presence of a polycondensation catalyst, thereby enhancing the film strength.

As the polycondensation catalysts, titanium-based catalysts, tin-based catalysts, zirconium-based catalysts, and aluminum-based catalysts are suitable. In the present disclosure, of these various catalysts, titanium diisopropoxybis (ethylacetateacetate) is most preferable of the titanium-based catalysts bringing excellent results. Titanium diisopropoxybis(ethylacetateacetate) is inferred to accelerate the condensation reaction of a silanol group and inhibit the catalyst from easily deactivating.

The carrier of the present disclosure preferably has a volume average particle diameter of from 20 to 100 μm. A volume average particle diameter of 20 μm or greater of particles of the carrier decreases carrier attachment. A volume average particle diameter of 100 μm or less prevents deterioration of reproducibility at detailed image portions, thereby producing fine images. A carrier with a volume average particle diameter of from 20 to 60 μm can be a suitable solution to the recent development on the image quality.

The volume average particle diameter can be measured with a microtrack particle size analyzer (model HRA 9320-X100 or SRA type, manufactured by NIKKISO CO., LTD.).

In the present disclosure, the coating liquid that forms a coating layer preferably contains a silane coupling agent. Such an inclusion makes it possible to stably disperse inorganic fine particles.

There is no specific limitation to the silane coupling agent. Specific examples include, but are not limited to, γ-(2-aminoethyl)aminopropyl trimethoxysilane, γ-(2-aminoethyl)aminopropyl methyldimethoxydlane, γ-methacryloxy propyltrimethoxysilane, N-β-(N-vinylbenzyl aminoethyl)-γ-aminopropyl trimethoxysilane hydrochloride, γ-glycidoxypropyl trimethoxysilane, γ-mercaptopropyl trimethoxysilane, methyltrimethoxysilane, methyltriethoxysilane, vinyltriacetoxysilane, γ-chloropropyl trimethoxysilane, hexamethyldisilazane, γ-anilinopropyl trimethoxysilane, vinyltrimethoxyxilane, octadecyldimethyl[3-(trimethoxysilyl)propyl]ammonium chloride, γ-chloropropylmethyl dimethoxy silane, methyltrichlorosilane, dimethyl dichlorosilane, trimethylchlorosilane, aryltriethoxysialne, 3-aminopropylmethyl diethoxysilane, 3-aminopropyltrimethoxysilane, dimethyl diethoxysilane, 1,3-divinyltetramethyl disilazane, and methacryloxy ethyl dimethyl(3-trimethoxysilylpropyl)ammonium chloride. These can be used alone or in combination.

Specific examples of the procurable silane coupling agent include, but are not limited to, AY43-059, SR6020, SZ-6023, SH6026, SZ6032, SZ6050, AY43-310M, SZ6030, SH6040, AY43-026, AY43-031, sh6062, Z-6911, sz6300, sz6075, sz6079, sz6083, sz6070, sz6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (all manufactured by Dow Corning Toray Co., Ltd.).

The proportion of a silane coupling agent to a silicone resin is preferably from 0.1 to 10 percent by mass. A proportion of 0.1 percent by mass or greater of a silane coupling agent enhances adhesiveness between a core particle, an electroconductive fine particle, and silicone resin, thereby preventing a coating layer from detaching over a long period of usage. A proportion of 10 percent by mass or less prevents toner from filming over a long period of usage.

In the present disclosure, the core material is not particularly limited as long as it is a magnetic substance. It includes, but is not limited to, strongly magnetized materials such as iron and cobalt, iron oxides such as magnetite, hematite, and ferrite, metal compounds and alloys, and resin particles dispersed in these magnetic substances. Of these, in terms of the environmental concerns, Mn-based ferrite, Mn—Mg-based ferrite, and Mn—Mg—Sr ferrite are preferable.

The coating layer preferably has an average film thickness of 0.50 μm or greater. An average film thickness of 0.50 μm or greater can form a film that can sufficiently hold fine particles without a deficiency on the film. The average film thickness of a coating layer is more preferably from 0.50 to 1.00 μm.

The carrier of the present disclosure can be formed by preparing a coating liquid for forming the coating layer mentioned above and uniformly applying the coating liquid to the surface of the core particle mentioned above by a known application method followed by drying and baking.

Specific examples of the known application methods include, but are not limited to, a dip coating method, a spray coating method, and a brushing method.

There is no specific limitation to the solvent and it can be suitably selected to suit to a particular application.

Specific examples include, but are not limited to, toluene, xylene, methylethylketone, methylisobutyl ketone, cellosolve, butylacetate, and synthetic isoparaffin-based hydrocarbon.

The method of baking is not particularly limited and can be suitably selected to suit to a particular application. It can be external or internal heating.

The device for baking is not particularly limited and can be suitably selected to suit to a particular application. It includes, but is not limited to, a fixed electric furnace, fluid type electric furnace, rotary electric furnace, burner furnace, and a device with a microwave.

The developing agent of the present disclosure contains the carrier of the present disclosure and toner.

The toner contains a binder resin, a colorant, a charge control agent, and an external additive. It can be monochrome or color toner. The toner may contain a releasing agent when it is applied to an oil free system in which no oil preventive for toner fixation is applied to a fixing roller. Such toner tends to cause filming in general. However, since the carrier of the present disclosure can reduce filming, the developing agent of the present disclosure can maintain good quality for an extended period of time. Color toner, especially yellow toner, causes color fouling resulting from scraping of the coating layer of a carrier. The developing agent of the present disclosure reduces the occurrence of this color fouling.

Toner can be manufactured by a known method such as pulverization and polymerization. For example, when toner is manufactured by pulverization, the mixture obtained by mixing and kneading toner materials is cooled down, pulverized, and classified to manufacture mother particles. Next, to enhance transferability and durability, external additives are added to the mother particle to manufacture toner.

The device for mixing and kneading toner materials is not particularly limited. For example, batch-type twin rolls, Bumbury's mixer, continuation-type twin shaft extruder such as a KTK type twin-shaft extruder (manufactured by KOBE STEEL, LTD.), a TEM type twin-shaft extruder (manufactured by TOSHIBA MACHINE CO., LTD.), a twin-shaft extruder (manufactured by ASADA IRON WORKS CO., LTD.), a PCM type twin-shaft extruder (manufactured by IKEGAI LTD.), and a KEX type twin-shaft extruder (manufactured by KURIMOTO LTD.); and a continuation-type single-shaft kneader such as a Co-Kneader manufactured by COPERION BUSS AG can be preferably used as the device for mixing and kneading the toner material.

In addition, when the cooled-down melt-kneaded mixture is pulverized, it is coarsely-pulverized with a device such as a hammer mill and ROTOPLEX, and thereafter finely-pulverized with a fine pulverizer utilizing a jet air or a mechanical force. It is preferable to pulverize the mixture until its average particle diameter is reduced to 3 to 15 μm.

Moreover, an air classifier can be used to further classify the pulverized melt-kneaded mixture. It is preferable to classify the mother particle until its average particle diameter becomes 5 to 20 μm.

In addition, when an external additive is added to the mother particle, these are mixed and stirred with a mixer so that the external additive is caused to adhere to the surface of the mother particle as the external additive is pulverized.

The binder resin is not particularly limited.

Specific examples include, but are not limited to, styrene polymers and substituted styrene polymers such as polystyrene, poly-p-styrene, and polyvinyltoluene; styrene copolymers such as styrene-p-chlorostyrene copolymers, styrene-propylene copolymers, styrene-vinyltoluene copolymers, styrene-methyl acrylate copolymers, styrene-ethyl acrylate copolymers, styrene-methacrylate copolymers, styrene-methyl methacrylate copolymers, styrene-ethyl methacrylate copolymers, styrene-butyl methacrylate copolymers, styrene-α-methyl chloromethacrylate copolymers, styrene-acrylonitrile copolymers, styrene-vinyl methyl ether copolymers, styrene-vinyl methyl ketone copolymers, styrene-butadiene copolymers, styrene-isopropylene copolymers, and styrene-maleic acid ester copolymers; and other resins such as polymethyl methacrylate, polybutyl methacrylate, polyvinyl chloride, polyvinyl acetate, polyethylene, polyesters, epoxy resins, polyurethane resins, polyvinyl butyral resins, polyacrylic resins, rosin, modified rosins, terpene resins, phenol resins, aliphatic or aromatic hydrocarbon resins, and aromatic petroleum resins. These resins can be used alone or in combination.

The binder resin for pressure fixing is not particularly limited.

Specific examples include, but are not limited to, polyolefins such as low molecular weight polyethylenes and low molecular weight polypropylenes; olefin copolymers such as ethylene acrylic acid copolymers, styrene-methacrylic acid copolymers, ethylene methacrylate copolymers, ethylene-vinyl chloride copolymers, ethylene-vinyl acetate copolymers, and ionomer resins; epoxy resins, polyester resins, styrene-butadiene copolymers, polyvinyl pyrrolidone, methylvinyl ether-maleic anhydride, maleic acid modified phenol resins, and phenol modified terpene resins. These can be used alone or in combination.

The colorant (pigment or dye) is not particularly limited.

Specific examples include, but are not limited to, yellow pigments such as cadmium yellow, mineral fast Yellow, nickel titanium yellow, naples yellow, Naphthol Yellow S, Hanza Yellow G, Hanza Yellow 10G, Benzidine Yellow GR, quinoline yellow lake, Permanent Yellow NCG, and tartrazine lake, orange pigments such as molybdenum orange, Permanent Orange GTR, pyrazolone orange, Vulcan Orange, and Indanthrene Brilliant orange GK, red pigments such as red iron oxide, cadmium red, Permanent Red 4R, lithol red, pyrazolone red, watching red calcium salt, Lake Red D, Brilliant Carmine 6B, Eosine Lake, Rhodamine Lake B, Alizarine Lake, and Brilliant Carmine 3B, violet pigments such as Fast Violet B and Methyl Violet Lake, blue pigments such as cobalt blue, Alkali Blue, Victoria Blue Lake, Phthalocyanine Blue, metal-free Phthalocyanine Blue, Phthalocyanine Blue portion chlorinated article, Fast Sky Blue, and Indanthrene Blue BC, green pigments such as Chrome Green, chromium oxide, Pigment Green B, and Malachite Green Lake, black pigments such as adine-based pigments such as carbon black, oil furnace black, channel black, lamp black, acetylene black, and aniline black, meal salt azo pigments, metal oxides, and complex metal oxides, and white pigments such as titanium oxide. These can be used alone or in combination. Also, these are not used in the case of transparent toner.

The releasing agent is not particularly limited.

Specific examples include, but are not limited to, polyolefins such as polyethylene and polypropylene, metal salts of aliphatic acid, esters of aliphatic acid, paraffin wax, amide-based waxes, polyalcohol waxes, silicone waxes, carnauba wax, ester waxes. These can be used alone or in combination.

The toner may furthermore contain a charge control agent. The charge control agent is not particularly limited.

Specific examples include, but are not limited to, nigrosine; azine dyes with alkyl groups having 2 to 16 carbon atoms; and basic dyes such as C.I.Basic Yellow 2 (C.I.41000), C.I.Basic Yellow 3, C.I.Basic Red 1 (C.I.45160), C.I.Basic Red 9 (C.I.42500), C.I.Basic Violet 1 (C.I.42535), C. I.Basic Violet 10 (C.I.45170), C.I.Basic Violet 14 (C.I.42510), C.I.Basic Blue 1 (C.I.42025), C.I.Basic Blue 3 (C.I.51005), C.I.Basic Violet 10 (C.I.42555), C.I.Basic Violet 14 (C.I.42510), C.I.Basic Blue 1 (C.I.42025), C.I.Basic Blue 3 (C.I.51005), C.I.Basic Blue 5 (C.I.42140), C.I.Basic Blue 7 (C.I.42595), C.I.Basic Blue 9 (C.I.52015), C.I.Basic Blue 24 (C.I.52030), C.I.Basic Blue 25 (C.I.52025), C.I.Basic Blue 26 (C.I.44045), C.I.Basic Green 1 (C.I.42040), and C.I.Basic Green 4 (C.I.42000); lake pigments of these basic dyes; quaternary ammonium salts such as C.I.Solvent Black 8 (C.I.26150), benzoylmethylhexadecylammonium chloride, and decyltrimethylchloride; dialkyltin compounds such as dibutyl and dioctyl; dialkyltin borate compounds; guanidine derivatives; polyamine resins such as vinyl polymers with amino groups and condensation polymers with amino groups; salicylic acid; metal complexes of dialkylsalicylic acid, naphthoic acid, and dicarboxylic acid with Zn, Al, Co, Cr or Fe; sulfonated copper phthalocyanine pigments; organic boron salts; fluorine-containing quaternary ammonium salts; and calixarene compounds. These can be used alone or in combination. Metal salts of white salicylic derivatives are preferable for color toner excluding black toner.

The external additive is not particularly limited. Examples include, but are not limited to, inorganic particles of silica, titanium oxide, alumina, silicon carbide, silicon nitride, and boron nitride, and resin particles such as polymethacrylic acid methyl particles and polystyrene particles having an average particle diameter of from 0.05 to 1 μm obtained by a soap-free emulsification polymerization method. These can be used alone or in combination. Of these, metal oxide particles such as silica or titanium oxide whose surface is hydrophobized are preferable. Furthermore, a toner obtained by using hydrophobized silica and hydrophobized titanium oxide where the amount of the hydrophobized titanium oxide is greater than that of the hydrophobized silica has chargeability stable to humidity.

The carrier of the present disclosure is used to prepare a developing agent of the carrier and toner for replenishment. This developing agent is applied to an image forming apparatus that forms images while ejecting extra development agents in the development device. Therefore, quality images are stably produced for an extremely extended period of time. That is, the carrier remaining degraded in the developing device is displaced with the carrier remaining fresh in the developing agent for replenishment to produce quality images over a long period of time while keeping the charging size stable. Toner spent on carrier degrades carrier charging in printing an image with a high resolution, which is the main cause of carrier deterioration. However, this method is especially effective in printing images with a high resolution because this method increases the amount of replenished carrier, resulting in an increase in the frequency of replacing the degraded carrier. Stable images can be thus produced over an extremely long period of time.

Regarding the proportion of the developing agent for replenishing, the ratio of toner to carrier is preferably from 2/1 to 50/1 in parts by mass. A proportion of 2/1 or greater of toner avoids excessive supply of a carrier, preventing too high a carrier proportion in a developing device. This proportion is thus unlikely to increase the charging size of a developing agent. An increase in the charging size degrades the developing ability, which leads to a decrease in image density. If the proportion is 50/1 or less, the ratio of the carrier in a developing agent for replenishing does not decrease. The carrier in an image forming apparatus is frequently displaced, being anticipated to demonstrate improvements on carrier deterioration.

The developing agent for forming an electrophotographic image of the present disclosure contains the carrier mentioned above of the present disclosure.

The toner's concentration in the developing agent is preferably from 4 to 9 percent by mass. The amount of the toner is large at a concentration of 4 percent by mass or greater, achieving a suitable image density. When the concentration is 9 percent by mass or less, the carrier tends to hold toner, preventing the toner from scattering.

Method of Forming Image

The method of forming an electrophotographic image of the present disclosure is executed with the developing agent of the present disclosure. The method includes: forming a latent electrostatic image on a latent electrostatic image bearer; developing the latent electrostatic image formed on the latent electrostatic image bearer with the developing agent of the present disclosure to form a toner image, transferring the toner image formed on the latent electrostatic image bearer to a printing medium, and fixing the toner image transferred to the printing medium.

Process Cartridge

The process cartridge of the present disclosure includes a container containing the developing agent of the present disclosure. It also includes a latent electrostatic image bearer, a charging member for charging the surface of the latent electrostatic image bearer, a developing member for developing a latent electrostatic image formed on the latent electrostatic image bearer with the developing agent of the present disclosure, and a cleaning member for cleaning the latent electrostatic image bearer.

FIG. 1 is a diagram illustrating an example of the process cartridge of the present disclosure. A process cartridge 10 integrally includes a photoconductor 11 as the latent electrostatic image bearer, a charger 12 as the charging member for charging the photoconductor 11, a developing device 13 as the developing member for developing the latent electrostatic image formed on the photoconductor 11 with the developing agent of the present disclosure to form a toner image, and a cleaning device 14 as the cleaning member for cleaning the photoconductor 11 of the toner remaining on the photoconductor 11 after the toner image is transferred to a printing medium. The process cartridge 10 is detachably attached to an image forming apparatus such as a photocopier and printer.

The method of forming images using an image forming apparatus carrying the process cartridge 10 is described below. The charger 12 uniformly charges the peripheral surface of the photoconductor 11 being rotationally driven at a particular peripheral speed at a positive or negative voltage. Next, an irradiator that employs slit irradiation or scanning with laser beams irradiates the peripheral surface of the photoconductor 11 with light to sequentially form latent electrostatic images. The developing device 13 develops the latent electrostatic image formed on the peripheral surface of the photoconductor 11 with the developing agent of the present disclosure to form a toner image. The toner image formed on the peripheral surface of the photoconductor 11 is rotated in synchronization with the rotation of the photoconductor 11 and sequentially transferred to a transfer medium transferred from a sheet feeder to between the photoconductor 11 and a transfer device. Then the transfer medium on which the toner image is transferred is separated from the peripheral surface of the photoconductor 11 and introduced into a fixing device. After the fixing device fixes the toner image on the transfer medium, the transfer medium is ejected outside the image forming apparatus as a photocopy. After the toner image is transferred, the surface of the photoconductor 11 is cleaned of the toner remaining thereon with the cleaning device 14 and discharged (quenched) with a discharging device (or quencher) to be ready for next image forming.

Image Forming Apparatus

The image forming apparatus of the present disclosure includes a container containing the developing agent of the present disclosure. It also includes a latent electrostatic image bearer, a charging device for charging the latent electrostatic image bearer, an irradiator for forming a latent electrostatic image on the latent electrostatic image bearer, a developing device for developing the latent electrostatic image formed on the latent electrostatic image bearer with a developing agent to form a toner image, a transfer device for transferring the toner image formed on the latent electrostatic image bearer to a printing medium, a fixing device for fixing the toner image transferred to the printing medium, and other optional devices such as a discharging device (quencher), a cleaning device, a recycling device, and a controlling device. The developing device used in this image forming is the developing agent of the present disclosure.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative examples but not limited thereto. "Parts" and "percent" respectively refer to "parts by mass" and "percent by mass" unless otherwise specified.

Example 1 of Carrier Manufacturing

Liquid Resin 1

- Acrylic resin solution with a concentration of solid portion of 20 percent by mass: 200 parts
- Silicone resin solution with a concentration of solid portion of 40 percent: 2,000 parts
- Amino silane with a concentration of solid portion of 100 percent: 35 parts
- Aluminum oxide with an equivalent circle diameter of 0.55 μm subjected to surface treatment with tin oxide doped with diantimony pentoxide: 700 parts
- Barium sulfate with an equivalent circle diameter of 0.60 μm 570 parts
- Toluene: 6,000 parts
- Dispersant (phosphoric acid based surfactant): 25 parts
- Defoaming agent (silicone-based, content of silicone: 1 percent): 430 parts The materials specified above for the liquid resin 1 were dispersed with a Homomixer for 10 minutes to prepare a liquid for forming a coating layer. The liquid resin 1 was applied to the surface of a carrier core, Mn—Mg—Sr ferrite with a volume average particle diameter of 36 μm, with a SPIRA COTA® SP-40 (manufactured by OKADA SEIKO CO., LTD.) at 60 degrees C. atmosphere at a rate of 30 g/min to form a layer with a thickness of 0.50 μm on the surface followed by drying. The thus-obtained carrier was left to rest in an electric furnace at 230 degrees C. for one hour followed by baking. Subsequent to cooling down, the resulting cooled matter was cracked with a sieve with an opening of 100 μm to obtain carrier 1. The average thickness T of the distance from the surface of the carrier core to the surface of the coating layer was 0.50 μm.

The volume average particle diameter of the carrier core was measured with a microtrac particle size analyzer (SRA type, manufactured by NIKKISO CO., LTD.) in the range of from 0.7 to 125 μm.

The average thickness T (μm) was obtained by measuring the distance between the surface of the core of a carrier and the surface of the coating layer of the carrier at 50 points on the cross section of the carrier spaced 0.2 μm therebetween along the surface of the carrier with a transmission electron microscope (TEM). The obtained measuring values were averaged to obtain the average thickness T.

Example 2 of Carrier Manufacturing

Carrier 2 was obtained in the same manner as in Example 1 of Carrier Manufacturing except that the aluminum oxide subjected to a surface treatment with tin oxide doped with diantimony pentoxide was changed to aluminum oxide subjected to surface treatment with tin oxide doped with diantimony trioxide.

Example 3 of Carrier Manufacturing

Carrier 3 was obtained in the same manner as in Example 1 of Carrier Manufacturing except that the phosphoric acid ester surfactant was changed to a sulfuric acid ester surfactant.

Example 4 of Carrier Manufacturing

Carrier 4 was obtained in the same manner as in Example 1 of Carrier Manufacturing except that the phosphoric acid ester surfactant was changed to a carboxylic acid ester surfactant.

Example 5 of Carrier Manufacturing

Carrier 5 was obtained in the same manner as in Example 1 of Carrier Manufacturing except that the aluminum oxide subjected to a surface treatment with tin oxide doped with diantimony pentoxide was changed to aluminum oxide subjected to surface treatment with tin oxide doped with diantimony trioxide.

Example 6 of Carrier Manufacturing

Liquid Resin 6

- Acrylic resin solution with a concentration of solid portion of 20 percent by mass: 200 parts
- Silicone resin solution with a concentration of solid portion of 40 percent: 2,000 parts
- Amino silane with a concentration of solid portion of 100 percent: 35 parts
- Aluminum oxide with an equivalent circle diameter of 0.55 nm subjected to surface treatment with tin oxide doped with diantimony pentoxide: 700 parts
- Toluene: 6,000 parts
- Dispersant (phosphoric acid based surfactant): 14 parts
- Defoaming agent (silicone-based, content of silicone: 1 percent): 400 parts Carrier 6 was obtained in the same manner as in Example 1 of Carrier Manufacturing except that the liquid resin 1 was changed to the liquid resin 6.

Example 7 of Carrier Manufacturing

Carrier 7 was obtained in the same manner as in the Manufacturing Example 1 except that barium sulfate was changed to magnesium oxide.

Example 8 of Carrier Manufacturing

Carrier 8 was obtained in the same manner as in the Manufacturing Example 1 except that barium sulfate was changed to hydrotalcite.

Example 9 of Carrier Manufacturing

Carrier 9 was obtained in the same manner as in the Manufacturing Example 1 except that barium sulfate was changed to magnesium hydroxide.

Example 10 of Carrier Manufacturing

Carrier 10 was obtained in the same manner as in the Manufacturing Example 1 except that barium sulfate was changed to aluminum oxide.

Example 11 of Carrier Manufacturing

Carrier 11 was obtained in the same manner as in Example 1 of Carrier Manufacturing except that the silicone-based surfactant was changed to an acrylic-based surfactant.

Example 12 of Carrier Manufacturing

Carrier 12 was obtained in the same manner as in Example 1 of Carrier Manufacturing except that the silicone-based surfactant was changed to a vinyl-based surfactant.

Example 13 of Carrier Manufacturing

Carrier 13 was obtained in the same manner as in Example 1 of Carrier Manufacturing except that the aluminum oxide subjected to a surface treatment with tin oxide doped with diantimony pentoxide was changed to tin oxide doped with diantimony trioxide.

Example 14 of Carrier Manufacturing

Carrier 14 was obtained in the same manner as in Example 1 of Carrier Manufacturing except that the phosphoric acid ester surfactant was changed to a dialkyl amine salt-based surfactant.

Manufacturing Example of Toner

Synthesis of Polyester Resin A

The following components were placed in a reaction tank equipped with a condenser, a stirrer, and a nitrogen introducing tube to conduct reaction at 230 degrees C. at normal pressure for 15 hours:

- Adduct of bisphenol A with 2 mole of ethylene oxide: 65 parts
- Adduct of bisphenol A with 3 mole of propylene oxide: 86 parts
- Terephthalic acid: 274 parts
- Dibutyl tin oxide: 2 parts Then the resulting substance was caused to conduct reaction for 6 hours under a reduced pressure of from 5 to 10 mm Hg to synthesize a polyester resin A. The obtained polyester resin A had a number average molecular weight Mn of 2,300, a weight average molecular weight Mw of 8,000, a glass transition temperature Tg of 58 degrees C., an acid value of 25 mgKOH/g, and a hydroxyl value of 35 mgKOH/g.

Synthesis of Prepolymer (Polymer Reactive with Compound Having Active Hydrogen Group)

The following components were placed in a reaction container equipped with a condenser, a stirrer, and a nitrogen introducing tube to conduct reaction at 230 degrees C. at normal pressure for eight hours.

- Adduct of bisphenol A with 2 mole of ethylene oxide: 682 parts
- Adduct of bisphenol A with 2 mole of propylene oxide: 81 parts
- Terephthalic acid: 283 parts
- Trimellitic anhydride: 22 parts
- Dibutyl tin oxide: 2 parts Then the resulting substance was caused to conduct reaction for 5 hours under a reduced pressure of from 10 to 15 mm Hg to synthesize an intermediate polyester resin.

The obtained intermediate polyester had a number average molecular weight Mn of 2,100, a weight average molecular weight Mw of 9,600, a glass transition temperature Tg of 55 degrees C., an acid value of 0.5, and a hydroxyl value of 49.

Next, 411 parts of the intermediate polyester, 89 parts of isophorone diisocyanate, and 500 parts of ethyl acetate were placed in a reaction container equipped with a condenser, stirrer, and a nitrogen introducing tube to conduct reaction at 100 degrees C. for 5 hours to synthesize a prepolymer (polymer reactive with the compound having an active hydrogen group).

The proportion of the isolated isocyanate of the obtained prepolymer was 1.60 percent by mass. The concentration of the solid component of the prepolymer after being left to rest at 150 degrees C. for 45 minutes was 50 percent by mass.

Synthesis of Ketimine (Compound Having Active Hydrogen Group)

A total of 30 parts of isophoronediamine and 70 parts of methylethyl ketone were placed in a reaction container equipped with a stirrer and a thermometer to conduct reaction at 50 degrees C. for 5 hours to obtain a ketimine compound (the compound having an active hydrogen group). The thus-obtained ketimine compound (the compound having an active hydrogen group) was 423.

Preparation of Master Batch

A total of 1,000 parts of water, 540 parts of carbon black (Printex 35, DPB oil absorbing amount of 42 mL/100 g, pH of 9.5, manufactured by Degussa AG), and 1,200 parts of the polyester resin A were mixed with a Henshel Mixer. Subsequent to kneading the mixture with two rolls at 150 degrees C. for 30 minutes, the resulting mixture was rolled and cooled down with a pulverizer (manufactured by Hosokawa Micron Corporation) to prepare a master batch.

Preparing Aqueous Medium

A total of 306 parts of deionized water, 265 parts of suspension of tricalcium phosphate at 10 percent by mass, and 1.0 part of sodium dodecylbenzenesulfonate were mixed and stirred to form a uniform solution. An aqueous medium was thus prepared.

Measuring of Concentration of Critical Micelle

The concentration of critical micelle of a surfactant was measured by the following method. Analysis was conducted with a surface tensiometer Sigma, manufactured by KSV Instruments using analysis program in the Sigma system. A surfactant was added dropwise to an aqueous medium 0.01 percent by 0.01 percent to measure the surface tension after being stirred and left to rest. From the obtained surface tension curve, the concentration of the surfactant below which the surface tension did not lower in adding the surfactant was determined as the concentration of critical micelle. The concentration of the critical micelle of sodium dodecylbenzenesulfonate to the aqueous medium was measured with a surface tensiometer Sigma. It was 0.05 percent by mass to the mass of the aqueous medium.

Preparation of Liquid Toner Material

A total of 70 parts of the polyester resin A, 10 parts of prepolymer, and 100 parts of ethyl acetate were stirred and dissolved in a beaker. A total of 5 parts of paraffin wax as a releasing agent (HNP-9, melting point of 75 degrees C., manufactured by NIPPON SEIRO CO., LTD.), 2 parts of MEK-ST (manufactured by Nissan Chemical Corporation), and 10 parts of master batch were added followed by three passes with a bead mill (ultra visco mill, manufactured by AIMEX CO., Ltd.) under the condition of a liquid sending speed of 1 kg/h, a peripheral speed of the disk of 6 m/s, and 0.5 mm zirconia beads filled at 80 percent volume. A total of 2.7 parts of the ketimine was added and dissolved in the beaker to prepare a liquid toner material.

Preparation of Emulsion or Liquid Dispersion

A total of 150 parts of the aqueous medium phase was placed in a container and stirred at 12,000 rpm with a TK type HOMOMIXER (manufactured by PRIMIX Corporation). A total of 100 parts of the liquid toner material was added to the container followed by mixing for 10 minutes to prepare an emulsion or liquid dispersion (emulsion slurry).

Removal of Organic Solvent

A total of 100 parts of the emulsion slurry was placed in a flask equipped with a stirrer and a thermometer and stirred at a stirring peripheral speed of 20 m/min to remove the solvent at 30 degrees C. for 12 hours to obtain a slurry dispersion.

Rinsing

After 100 parts of the slurry dispersion was filtered under a reduced pressure, 100 parts of deionized water was added to the filtered cake and mixed with a TK HOMOMIXER at 12,000 rpm for 10 minutes followed by filtering. Then 300 parts of deionized water was added to the obtained filtered cake and mixed with a TK HOMOMIXER at 12,000 rpm for 10 minutes followed by filtering twice. A total of 20 parts of an aqueous solution of 10 percent by mass sodium hydroxide was added to the obtained filtered cake. The resulting mixture was mixed with a TK HOMOMIXER at 12,000 rpm for 30 minutes followed by filtering under a reduced pressure. A total of 300 parts of deionized water was added to the filtered cake obtained and the resulting mixture was mixed with a TK HOMOMIXER (at 12,000 rpm for 10 minutes) followed by filtering. Then 300 parts of deionized water was added to the obtained filtered cake and mixed with a TK HOMOMIXER at 12,000 rpm for 10 minutes followed by filtering twice. A total of 20 parts of hydrochloric acid at 10 percent to the obtained filtered cake. The resulting mixture was mixed with a TK HOMOMIXER at 12,000 rpm for 10 minutes followed by filtering.

Adjusting Amount of Surfactant

A total of 300 parts of deionized water was added to the filtered cake obtained by the rinsing described above. The electric conductivity of the liquid toner dispersion obtained by mixing with a TK HOMOMIXER at 12,000 rpm for 10 minutes was measured. The concentration of the surfactant of the liquid toner dispersion was calculated from the calibration curve of the concentration of the surfactant created in advance. Based on the value obtained, deionized water was added to achieve the target concentration of 0.05 percent of the surfactant. A liquid toner dispersion was thus obtained.

Surface Treatment

The liquid toner dispersion adjusted to have the target concentration of the surfactant was heated in a water bath at a heating temperature Ti of 55 degrees C. for 10 hours while being mixed with a TK HOMOMIXER at 5,000 rpm. Thereafter, the liquid toner dispersion was cooled down to 25 degrees C. followed by filtering. A total of 300 parts of deionized water was added to the filtered cake obtained and the resulting mixture was mixed with a TK HOMOMIXER (at 12,000 rpm for 10 minutes) followed by filtering.

Drying

The obtained filtered cake was dried with a circulation drier at 45 degrees C. for 48 hours. The dried cake obtained was sieved with a screen having an opening of 75 μm to obtain mother toner particle 1.

External Additive Treatment

A total of 100 parts of the mother toner particle 1 was mixed with 3.0 parts of hydrophobic silica with an average particle diameter of 100 nm, 1.0 part of titanium oxide with an average particle diameter of 20 nm, and 1.5 parts of fine powder of hydrophobic silica with an average particle diameter of 15 nm with a Henschel Mixer to obtain toner 1.

Example 1

A total of 7 parts of the toner 1 obtained in Manufacturing Example of Toner and 93 parts of the carrier 1 obtained in Manufacturing Example 1 of Carrier were stirred in the mixer for 3 minutes to prepare developing agent 1.

Examples 2 to 12

Developing agents 2 to 12 were prepared in the same manner as in Example 1 except that the carrier 1 was changed to the carriers 2 to 12 shown in Table 2.

Comparative Example 1

Developing agent 13 was prepared in the same manner as in Example 1 except that the carrier 1 was changed to the carrier 13 shown in Table 2.

Comparative Example 2

Developing agent 14 was prepared in the same manner as in Example 1 except that the carrier 1 was changed to the carrier 14 shown in Table 2.

Regarding the obtained developing agents, the compositions of the coating layer of each carrier was shown in Table 1.

TABLE 1

| | Carrier type | Antimony type | Dispersant type | Substrate particle |
|---|---|---|---|---|
| Example 1 | 1 | Diantimony pentoxide | Phosphoric acid ester | Aluminum oxide |
| Example 2 | 2 | Antimony trioxide | Phosphoric acid ester | Aluminum oxide |
| Example 3 | 3 | Diantimony pentoxide | Sulfuric acid ester | Aluminum oxide |
| Example 4 | 4 | Diantimony pentoxide | Carboxylic acid | Aluminum oxide |
| Example 5 | 5 | Diantimony pentoxide | Phosphoric acid ester | Titanium Oxide |
| Example 6 | 6 | Diantimony pentoxide | Phosphoric acid ester | Aluminum oxide |
| Example 7 | 7 | Diantimony pentoxide | Phosphoric acid ester | Aluminum oxide |
| Example 8 | 8 | Diantimony pentoxide | Phosphoric acid ester | Aluminum oxide |
| Example 9 | 9 | Diantimony pentoxide | Phosphoric acid ester | Aluminum oxide |
| Example 10 | 10 | Diantimony pentoxide | Phosphoric acid ester | Aluminum oxide |
| Example 11 | 11 | Diantimony pentoxide | Phosphoric acid ester | Aluminum oxide |
| Example 12 | 12 | Diantimony pentoxide | Phosphoric acid ester | Aluminum oxide |
| Comparative Example 1 | 13 | Diantimony pentoxide | Phosphoric acid ester | None |
| Comparative Example 2 | 14 | Diantimony pentoxide | Dialkyl amine salt | Aluminum oxide |

| | Inorganic fine particle other than particle containing antimony | Defoaming agent type |
|---|---|---|
| Example 1 | Barium sulfate | Silicone-based |
| Example 2 | Barium sulfate | Silicone-based |
| Example 3 | Barium sulfate | Silicone-based |
| Example 4 | Barium sulfate | Silicone-based |
| Example 5 | Barium sulfate | Silicone-based |
| Example 6 | None | Silicone-based |
| Example 7 | Magnesium oxide | Silicone-based |
| Example 8 | Hydrotalcite | Silicone-based |
| Example 9 | Magnesium hydroxide | Silicone-based |
| Example 10 | Aluminum oxide | Silicone-based |
| Example 11 | Barium sulfate | Acrylic-based |
| Example 12 | Barium sulfate | Vinyl-based |
| Comparative Example 1 | Barium sulfate | Silicone-based |
| Comparative Example 2 | Barium sulfate | Silicone-based |

Evaluation on Developing Agent

The following was evaluated by using the thus-obtained developing agents 1 to 14.

Edge carrier attachment and solid carrier attachment were evaluated for evaluating carrier scraping, charging, and fluctuation of resistance in printing over a long period of time. Toner scattering, image density, initial rising of charging, charging stability over time, and ghost images were evaluated for evaluating charging stability in printing over a long period of time.

The developing agent was placed in a procured digital full color multifunction peripheral (Pro C9100, manufactured by Ricoh Co., Ltd.) to evaluate the images produced.

Toner Scattering

The amount of the toner accumulating below the developing agent bearer was suctioned and collected after producing images with a run length of 1 million. The mass of the toner collected was measured. The evaluation criteria are as follows. Grades S, A and B are allowable.

S (very good): 0 to less than 50 mg

A (good): 50 to less than 100 mg

B (fair): 100 to less than 250 mg

C (poor): 250 mg or greater

Edge Carrier Attachment

After the run length of 1 million, the machine was placed in an environment evaluation chamber (low temperature of 10 degrees C. and low moisture of 15 percent) and left to rest for one day. Thereafter, edge carrier attachment was evaluated with each developing agent.

Under the condition of a developing charging voltage Vd of −630 V and a developing bias of DC of −500V and setting an area of 170 μm×170 μm as one cell, an image of solid portions and white portions alternately arranged horizontally and perpendicularly was output in A3 size. The number of missing dots caused by carrier attachment at the borders between the cells were counted. The evaluation criteria are as follows. Grades S, A and B are allowable.

S (very good): 0

A (good): 1 to 3

B (fair): 4 to 10

C (poor): 11 or greater

Solid Carrier Attachment

After the run length of 1 million, the machine was placed in an environment evaluation chamber at 25 degrees C. and 60 percent moisture and left to rest for one day. Thereafter, solid carrier attachment was evaluated with each developing agent.

In the middle of producing solid images under the developing conditions (charging voltage Vd of −600 V, voltage at the solid image portion of −100 V after irradiation, developing bias of DC of −500 V), this image forming was stopped by a method such as turning off the power and the number of the carrier attached to the image bearer after transfer was counted for evaluation. The region to be evaluated was a 10 mm×100 mm region on the image bearer. The evaluation criteria are as follows. Grades S, A and B are allowable.

S (very good): 0

A (good): 1 to 3

B (fair): 4 to 10

C (poor): 11 or greater

Image Density

The machine was placed in an environment evaluation chamber (temperature of 10 degrees C. and moisture of 15 percent). After a run length of 100,000, a white solid image was printed on three A3 sheets (MyPaper, manufactured by Ricoh Co., Ltd.) and a black solid image was printed on three A3 sheets followed by evaluating the image density on the image samples.

The evaluation results were graded from S to C. Grades S, A and B are allowable.

S: Very good
A: Good
B: Fair
C: Poor

Initial Rising of Charging

Initial carrier and toner were mixed at a ratio of 93:7 (in percent by mass). The sample triboelectrically charged was measured with a blow-off device (TB-200, manufactured by Toshiba Chemical Corporation). The charging size at 15 seconds after the initiation of mixing the carrier and toner was defined as Q1 and the charging size at 600 seconds after the initiation was defined as Q2. The absolute value obtained from (Q1−Q2)/Q1×100 was defined as the initial rising of charging. The evaluation criteria are as follows. Grades S, A and B are allowable.

S (very good): 15 or greater
A (good): 10 to less than 15
B (fair): 5 to less than 10
C (poor): 0 to less than 5

Charging Stability Over Time

An image with an image area ratio of 40 percent was printed on 1 million sheets with the developing agents of 1 to 14 of Examples and Comparative Examples and the developing agents for replenishment for the developing agents 1 to 14 using a Ricoh's digital color multifunction peripheral photocopier and printer Pro C9100. The carrier after this printing was evaluated.

The initial carrier charging size Q1 was measured for triboelectrically charged samples containing carrier 1 to 14 and toner 1 at a mixing ratio of 93:7 with a blow-off device TB-200 (manufactured by Toshiba Chemical Corporation). In addition, the charging size Q2 of the carrier after a run length of 1 million was measured in the same manner as described above except that the carrier used was obtained by removing each color toner in the developing agent with the blow-off device after the run length of 1 million. The absolute value obtained from (Q1−Q2)/Q1×100 was defined as the change ratio of charging size. The evaluation criteria are as follows. Grades S, A and B are allowable.

Figure 2A:
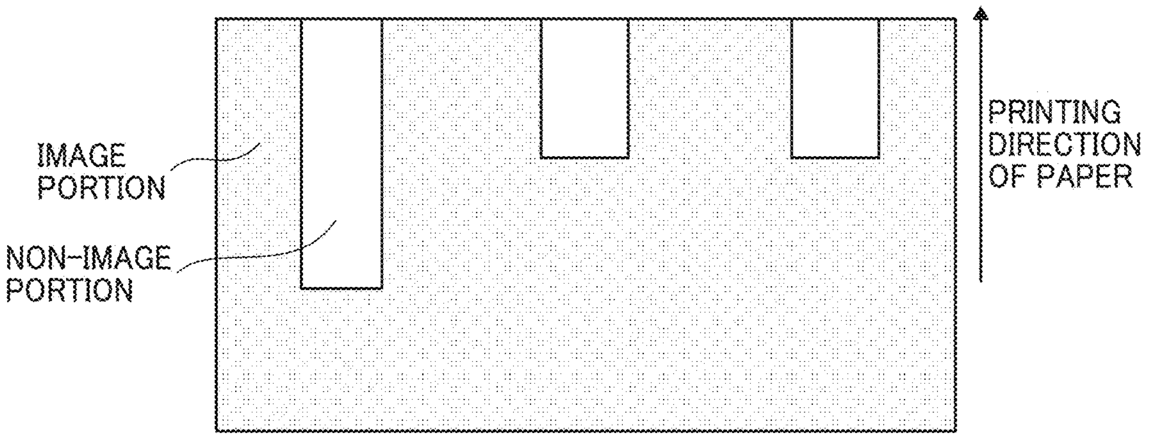
FIG. 2A is a diagram illustrating a proper image and a ghost image in a portrait band chart.
Figure 2B:
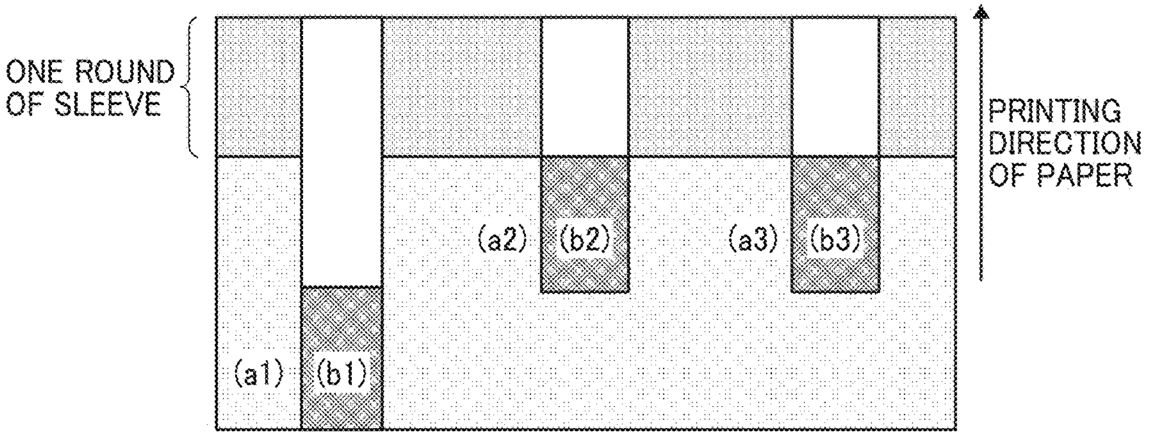
FIG. 2B is a diagram illustrating a ghost image in a portrait band chart.

S (very good): 0 to less than 5
A (good): 5 to less than 10
B (fair): 10 to less than 20
C (poor): 20 or greater Ghost Image The portrait band chart with an image area ratio of 8 percent as illustrated in FIG. 2 was printed in an A4 sheet. The difference in concentration between the one around a of the sleeve and one more round b was measured at three sites, the center, rear, and front, of the sheet with X-Rite 938 (manufactured by X-Rite Inc.) and defined as ΔID The results were graded. FIG. 2A is a diagram illustrating a normal image of the portrait band chart and the FIG. 2B is a diagram illustrating ghost images b1, b2, and b3 against the image portions a1, a2, and a3, respectively.

S (very good)
A (good)
B (fair)
C (poor, not suitable for practical use)
S, A, and B are allowable and C is intolerable.
S (very good): 0.01>ΔID
A (good): 0.01<ΔID≤0.03
B (fair): 0.03<ΔID≤0.06
C (poor): 0.06<ΔID The evaluation results on the images are shown in Table 2.

TABLE 2

| | Carrier type | Toner scattering | Image density | 1 million sheet edge carrier attachment |
|---|---|---|---|---|
| Example 1 | 1 | S | S | S |
| Example 2 | 2 | A | S | S |
| Example 3 | 3 | A | S | A |
| Example 4 | 4 | A | S | A |
| Example 5 | 5 | S | S | A |
| Example 6 | 6 | B | A | A |
| Example 7 | 7 | S | B | A |
| Example 8 | 8 | S | A | A |
| Example 9 | 9 | S | B | A |
| Example 10 | 10 | S | B | A |
| Example 11 | 11 | A | S | S |
| Example 12 | 12 | A | S | S |
| Comparative Example 1 | 13 | A | A | B |
| Comparative Example 2 | 14 | A | A | B |

| | 1 million sheet solid carrier attachment | Initial rising of charging | Charging stability over time | Ghost image |
|---|---|---|---|---|
| Example 1 | S | S | S | S |
| Example 2 | A | A | A | A |
| Example 3 | A | A | S | S |
| Example 4 | A | A | S | S |
| Example 5 | B | S | A | S |
| Example 6 | B | B | B | A |
| Example 7 | A | A | A | A |
| Example 8 | A | A | A | A |
| Example 9 | A | A | A | A |
| Example 10 | A | A | A | B |
| Example 11 | A | A | A | S |
| Example 12 | A | A | A | S |
| Comparative Example 1 | C | A | B | A |
| Comparative Example 2 | C | A | A | B |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A carrier for forming an electrophotographic image comprising:
a core particle; and
a coating layer coating the core particle,
wherein the coating layer comprises a particle comprising antimony and an anionic dispersant and the particle comprising antimony comprises a substrate particle comprising a first inorganic fine particle, and
wherein the particle comprising antimony comprises diantimony pentoxide.

2. The carrier according to claim 1, wherein the particle comprising antimony comprises tin oxide doped with antimony.

3. The carrier according to claim 1, wherein the first inorganic fine particle comprises aluminum oxide.

4. The carrier according to claim 1, wherein the anionic dispersant comprises a phosphoric acid ester surfactant.

5. The carrier according to claim 1, wherein the coating layer comprises a defoaming agent.

6. The carrier according to claim 5, wherein the defoaming agent comprises a silicone-based defoaming agent.

7. The carrier according to claim 1, wherein the coating layer further comprises a second inorganic fine particle.

8. The carrier according to claim 7, wherein the second inorganic fine particle is white.

9. The carrier according to claim 7, wherein the second inorganic fine particle comprises barium sulfate.

10. The carrier according to claim 9, wherein the second inorganic fine particle comprises barium sulfate alone.

11. A developing agent for forming an electrophotographic image comprising:

the carrier of claim 1.

12. A method of forming an electrophotographic image comprising:

forming a latent electrostatic image on a latent electrostatic image bearer, developing the latent electrostatic image formed on the latent electrostatic image bearer with the developing agent of claim 11, thereby forming a toner image, transferring the toner image formed on the latent electrostatic image bearer to a printing medium, and fixing the toner image transferred to the printing medium, thereby obtaining the electrophotographic image.

13. An electrophotographic image forming apparatus comprising a process cartridge, the process cartridge comprising:

a container, containing the developing agent of claim 11, a photoconductor as a latent electrostatic image bearer, a charger, and a developing device.

14. A process cartridge comprising:

a container, containing the developing agent of claim 11, a photoconductor as a latent electrostatic image bearer, a charger, and a developing device.

* * * * *